US009589567B2

(12) United States Patent
Sankaranarayanan et al.

(10) Patent No.: US 9,589,567 B2
(45) Date of Patent: Mar. 7, 2017

(54) PLANT CONTROL SYSTEM USING VOICE AS A CONTROL MECHANISM

(71) Applicant: HONEYWELL INTERNATIONAL INC., Morristown, NJ (US)

(72) Inventors: Sridhar Sankaranarayanan, Karnataka (IN); Sriram Ranganathan, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 14/301,953

(22) Filed: Jun. 11, 2014

(65) Prior Publication Data

US 2015/0364142 A1    Dec. 17, 2015

(51) Int. Cl.
| | | |
|---|---|---|
| G10L 21/00 | (2013.01) | |
| G10L 17/22 | (2013.01) | |
| G06Q 50/00 | (2012.01) | |
| G06F 21/32 | (2013.01) | |

(52) U.S. Cl.
CPC .............. *G10L 17/22* (2013.01); *G06F 21/32* (2013.01); *G06Q 50/00* (2013.01); *G06F 2221/2111* (2013.01)

(58) Field of Classification Search
USPC ......................... 704/246, 247, 251, 252, 275
See application file for complete search history.

(56) References Cited

U.S. PATENT DOCUMENTS

| | | | |
|---|---|---|---|
| 6,081,782 A | 6/2000 | Rabin | |
| 6,601,762 B2 | 8/2003 | Piotrowski | |
| 2002/0190124 A1* | 12/2002 | Piotrowski | ........... G06Q 20/341 235/382 |
| 2003/0122652 A1* | 7/2003 | Himmelstein | ........ B60R 25/257 340/5.81 |
| 2005/0275505 A1* | 12/2005 | Himmelstein | .......... G10L 17/22 340/5.8 |
| 2007/0049363 A1 | 3/2007 | Green et al. | |
| 2013/0226586 A1* | 8/2013 | Jang | ........................ H04K 1/02 704/273 |
| 2013/0329867 A1* | 12/2013 | Hodge | .................... H04M 1/67 379/88.02 |
| 2013/0339020 A1 | 12/2013 | Heo et al. | |

(Continued)

FOREIGN PATENT DOCUMENTS

| | | |
|---|---|---|
| EP | 2713366 A1 | 4/2014 |
| KR | 20100009730 | 1/2010 |

*Primary Examiner* — Leonard Saint Cyr

(74) *Attorney, Agent, or Firm* — Jetter & Associates, P.A.

(57) ABSTRACT

A system and method for controlling processing equipment. The system includes a control computer communicatively coupled to a terminal computer. Voice data for each of several authorized operators at a plant is stored. The control computer is programmed to implement a voice recognition and authenticated voice-activated control program. The control computer, responsive to receiving a voice-derived input, analyzes the voice-derived input to determine if the voice-derived input matches the voice data for any of the authorized operators. Provided the voice-derived input matches the voice data, the control computer determines at least one command from the voice-derived input for controlling the processing equipment to modify an operation at the plant. The control computer executes the command to control the processing equipment.

14 Claims, 7 Drawing Sheets

(56) References Cited

U.S. PATENT DOCUMENTS

| | | | |
|---|---|---|---|
| 2014/0070917 A1* | 3/2014 | Protopapas | B60R 25/25 340/3.1 |
| 2014/0156283 A1* | 6/2014 | Himmelstein | G10L 17/22 704/275 |
| 2014/0162598 A1* | 6/2014 | Villa-Real | H04M 1/66 455/411 |

* cited by examiner

PLANT CONTROL SYSTEM USING VOICE AS A CONTROL MECHANISM

FIELD

Disclosed embodiments relate to computer systems used with industrial hardware devices and more specifically relate to computer control of processing equipment or material handling equipment involving a tangible material at a plant.

BACKGROUND

Loading terminals and bulk material distribution plants are used to load and distribute a variety of bulk tangible materials. For example, at a petroleum refinery, tank trucks enter a loading terminal to be filled with liquid fuels such as gasoline or diesel fuel for distribution to retail delivery stations. At a fertilizer manufacturing plant, semi-trucks enter a loading terminal to be filled with fertilizer for distribution to wholesale distributors and farms. At a cement plant, semi-trucks enter a loading terminal to be filled with cement for distribution to wholesale distributors and cement plants.

Loading terminals have used process control computers to assist with record keeping and safety checks. For example, after fuel has been dispensed into a tank truck, a computer can print a bill of lading to accompany the shipment that identifies the type and quantity of dispensed product. In a large terminal operation with multiple loading stations, it can be difficult for one or more operators to effectively monitor and control the operations within the plant loading terminal facility.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments include a system for controlling processing equipment or material handling equipment involving a tangible material at a plant. The system includes a control computer communicatively coupled by a communication path to a terminal computer. The control computer includes a processor connected to a storage device that has a non-transitory machine readable storage medium. The storage device stores voice data for each of a plurality of authorized operators at the plant and a voice recognition and authenticated voice-activated control (VR/VAC) program. The control computer is programmed to implement the VR/VAC program. The control computer, responsive to receiving a voice-derived input over a communications path, analyzes the voice-derived input to determine if the voice-derived input matches the voice data for any of the plurality of authorized operators. Provided the voice input matches the voice data, the control computer determines at least one command from the voice-derived input for controlling the processing equipment or the material handling equipment to modify the operation. The control computer executes the command to control the processing equipment or the material handling equipment.

One disclosed embodiment comprises a method for controlling processing equipment or material handling equipment involving a tangible material at a plant. The method includes providing a control system including non-transitory machine readable storage and at least one processor. Voice data for each of a plurality of authorized operators at the plant and an algorithm for voice recognition and authenticated voice-activated control (VR/VAC) of at least one operation at the plant are stored in the machine readable storage. The VR/VAC algorithm is implemented by the processor causing the processor to execute responsive to receiving a voice-derived input over a communications path analyzing of the voice-derived input to determine if the voice-derived input matches the voice data for any of the authorized operators. Provided the voice input matches the voice data, at least one command is determined from the voice-derived input for controlling the processing equipment or the material handling equipment to modify the operation. The command is executed to control the processing equipment or the material handling equipment.

DETAILED DESCRIPTION

Figure 1:
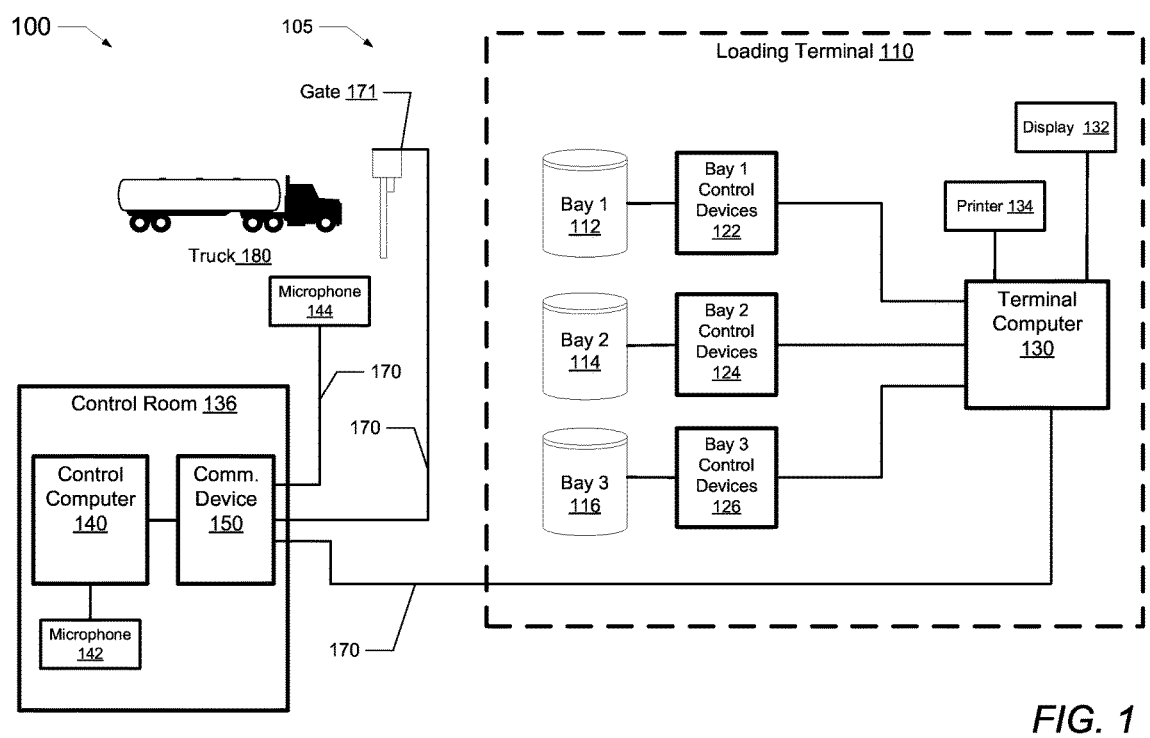
FIG. 1 is a block diagram of an example communication system within a plant that uses processing equipment or material handling equipment involving a tangible material, according to an example embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Disclosed embodiments provide a method, system and computer program product for controlling processing equipment or material handling equipment involving a tangible material at a plant. The system includes a control computer communicatively coupled by a communication path to a terminal computer. The control computer includes a processor connected to a storage device that has a non-transitory machine readable storage medium. The storage device stores voice data for each of a plurality of authorized operators at the plant and a voice recognition and authenticated voice-activated control (VR/VAC) program. The control computer is programmed to implement the VR/VAC program. The control computer, responsive to receiving a voice-derived input over a communications path, analyzes the voice-derived input to determine if the voice-derived input matches the voice data for any of the plurality of authorized operators. Provided the voice input matches the voice data, the control computer determines at least one command from the voice-derived input for controlling the processing equipment or the material handling equipment to modify the operation. The control computer executes the command to control the processing equipment or the material handling equipment.

FIG. 1 illustrates a block diagram of an example material processing plant 100 that includes a communication system 105. Material processing plant 100 can be a variety of manufacturing plants that handle and process a tangible material. In one embodiment, material processing plant 100 can be a petroleum refinery. In another embodiment, material processing plant 100 can be a grain processing and shipping facility. Material processing plant 100 has a loading terminal 110 and a control room 136. Trucks 180 are able to enter the loading terminal 110 through a gate 171 in order to load and pickup up tangible materials.

Communication system 105 allows for communication between various components and subsystems of the material processing plant 100. As shown in FIG. 1, communication system 105 comprises a control computer 140 that is in communication with one or more terminal computers 130 via a communication device 150 and a communication connection or path 170.

Loading terminal 110 comprises several loading stations or bays including bay 1 112, bay 2 114 and bay 3 116 (collectively bays 112-116). Bays 112-116 are each able to receive a truck 180 and are able to load truck 180 independently of the other bays. The operation of each bay is controlled by a bay control device. Bay 1 112 is connected to bay 1 control devices 122. Bay 2 114 is connected to bay 2 control devices 124. Bay 3 116 is connected to bay 3 control devices 126. In one embodiment, bay control devices 122-126 can be fluid control devices such as pumps, valves, meters and tank sensors. Each of the bay control devices 122-126 is communicatively coupled to a terminal computer 130.

Terminal computer 130 can transmit instructions and commands to bay control devices 122-126 and can receive data from bay control devices 122-126. For example, the terminal computer 130 can transmit a command to bay control device 122 to turn on a pump in order to fill truck 180. Terminal computer 130 is also communicatively coupled to a video display 132 and a printer 134. In one embodiment, video display 132 is located in a central location where it is visible from each of bays 112-116. Video display 132 can display information such as which bays are empty and which bays are occupied. Printer 134 can print documents such as bills of lading, receipts and invoices.

Control room 136 comprises a control computer 140, microphone 142 and communication device 150. Control computer 140 is connected to microphone 142. Control computer 140 can receive voice data that is spoken by an operator into the microphone 142. Control computer 140 is further connected to communication device 150. Communication device 150 provides communication between control computer 140 and terminal computer 130 via an electrical cable or communication path 170. Electrical cable or communication path 170 is connected between communication device 150 and terminal computer 130. In one embodiment, communication device 150 can provide a computer communication interface such as an Ethernet connection. The control computer 140 can be connected or networked to other target servers. In one embodiment, control computer 140 can operate in the capacity of a client machine in a client-server network environment.

Communication device 150 is also connected via a communication path 170 to microphone 144 and to gate 171. Control computer 140 can receive voice data that is spoken by a driver of truck 180 into microphone 144 via communication path 170 and communication device 150. Control computer 140 can transmit commands to gate 171, such as open gate or close gate, via communication path 170 and communication device 150.

Figure 2:
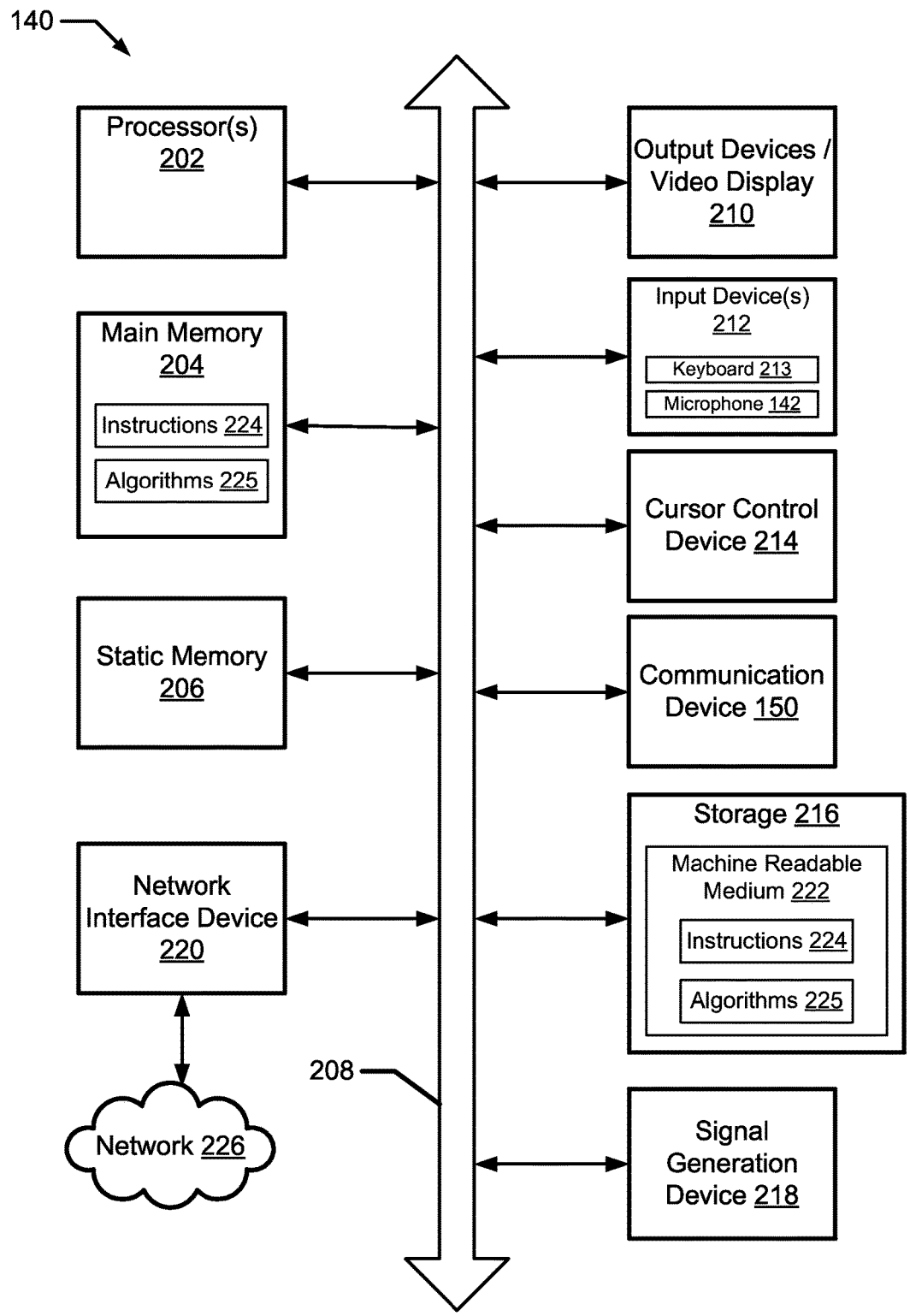
FIG. 2 is a block diagram of an example control computer, according to an example embodiment.

FIG. 2 illustrates an example block diagram of control computer 140 within which a set of instructions 224 and/or algorithms 225 can be executed causing the control computer 140 to perform any one or more of the methods, processes, operations, applications, or methodologies described herein.

Control computer 140 includes one or more processors 202 such as a central processing unit (CPU), a graphics processing unit (GPU) or both, a main memory 204 and a static memory 206, which communicate with each other via a system bus 208 which can represent a data bus and an address bus. Main memory 204 can store instructions 224 and/or algorithms 225 for execution by processor 202. The control computer 140 further includes output devices such as an output devices/video display 210 and a signal generation device 218 (e.g., a speaker) which are connected to system bus 208. The control computer 140 also has input devices 212 such as an alphanumeric input device (e.g., keyboard 213), microphone 142 and a cursor control device 214 (e.g., a mouse) that are connected to system bus 208. A network interface device 220 is shown connected to an external communication network 226 to enable communication with the system bus 208.

A storage device 216, such as a hard drive or solid state drive, is connected to and in communication with the system bus 208. The storage device 216 includes a machine readable medium 222 on which is stored one or more sets of software such as instructions 224 and/or algorithms 225 embodying any one or more of the methodologies or functions described herein. The instructions 224 and/or algorithms 225 can also reside, completely or at least partially, within the main memory 204 and/or within the processor 202 during execution thereof by the control computer 140. The main memory 204 and the processor 202 also containing machine readable media. The instructions 224 and/or algorithms 225 can further be transmitted or received over network 226 via the network interface device 220.

While the machine readable medium 222 is shown in an example embodiment to be a single medium, the term "machine readable medium" should be taken to include a single medium or multiple media (e.g., a centralized or distributed database, and/or associated caches and servers) that store the one or more sets of instructions. The term "machine readable medium" shall also be taken to include any medium that is capable of storing, encoding or carrying a set of instructions for execution by the computer system and that cause the computer system to perform any one or more of the methodologies shown in the various embodiments of the present invention. The term "machine readable medium" shall accordingly be taken to include, but not be limited to, solid-state memories, optical and magnetic media, and carrier wave signals.

Figure 3A:
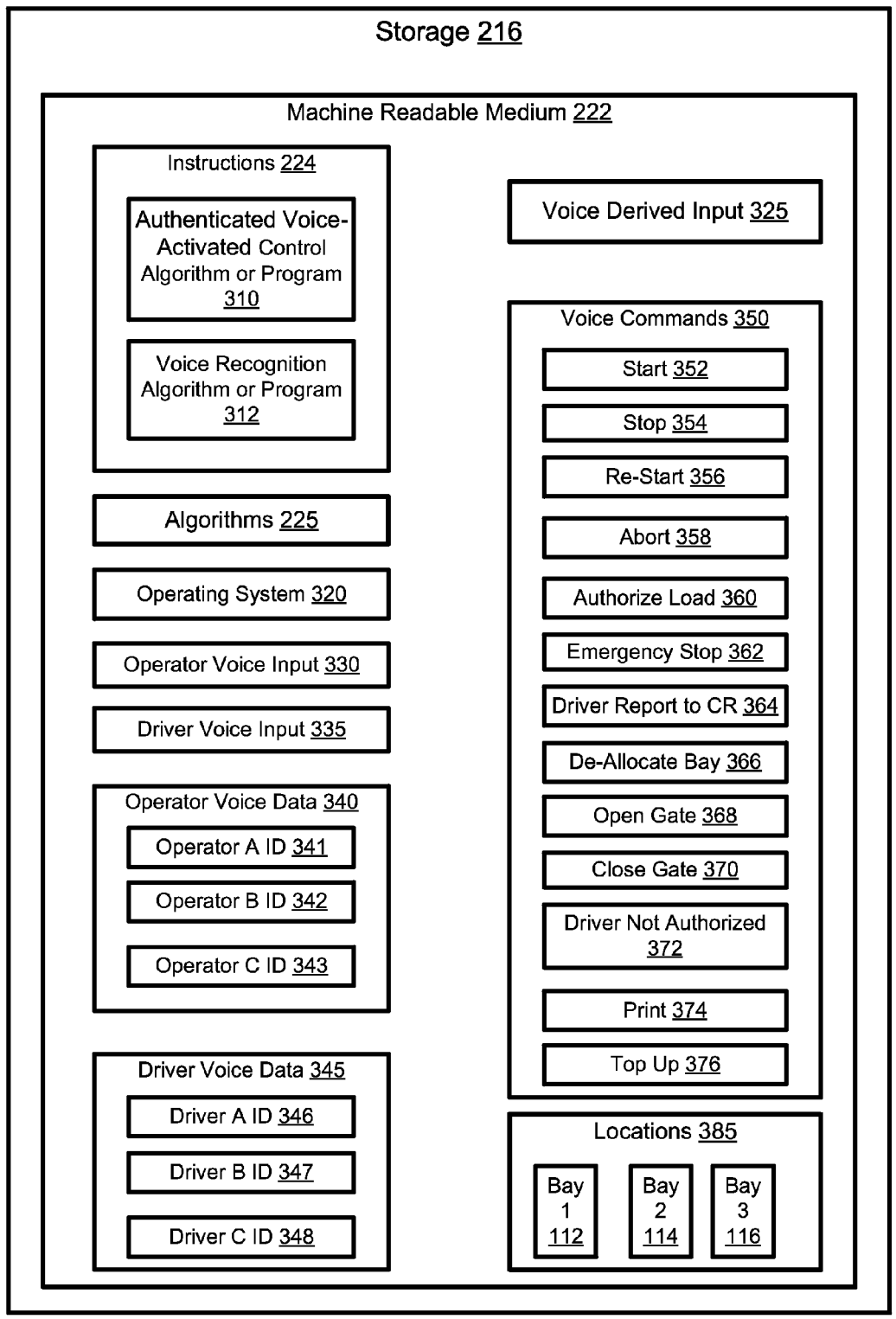
FIGS. 3A-3B provide an example illustration of contents of a computer readable storage medium, according to an example embodiment.

With reference to FIG. 3A, example contents of machine readable medium 222 stored within storage device 216 are shown. Machine readable medium 222 can store instructions 224 and/or algorithms 225 for execution by processor 202. Instructions 224 can include a voice recognition algorithm or program 312 and an authenticated voice-activated control (VR/VAC) algorithm or program 310. Voice recognition algorithm or program 312, when executed by processor 202 can recognize and decode voice input data from microphones 142 and 144 producing voice-derived input 325. VR/VAC algorithm or program 310, when executed by processor 202 can authenticate an operator or driver of truck 180 and determine one or more commands to control processing equipment or material handling equipment such as bay control devices 122-126.

An operating system (O/S) 320 is also stored in machine readable medium 222. Operating system (O/S) 320 manages resources and provides common services for control computer 140. Machine readable medium 222 further can store operator voice input 330 from operators in control room 136 and driver voice input 335 from drivers of trucks 180. Machine readable medium 222 also can store operator voice data 340 and driver voice data 345. Operator voice data 340 includes data that allows processor 202 to determine the identity of a specific control room operator based on recognizing the operator's voice. Operator voice data 340 includes operator A voice identification (ID) data 341, operator B voice ID data 342 and operator C voice ID data 343. Driver voice data 345 includes data that allows processor 202 to determine the identity of a specific truck driver based on recognizing the truck driver's voice. Driver voice data 345 includes driver A voice identification (ID) data 346, driver B voice ID data 347 and driver C voice ID data 348.

Machine readable medium 222 further can store spoken voice commands 350 that are spoken by a control room operator, recognized by voice recognition algorithm or program 312 and acted upon by authenticated VR/VAC algorithm or program 310. Voice commands 350 include start command 352, stop command 354, re-start command 356, abort command 358, authorize load command 360, emergency stop command 362, driver report to control room command 364, de-allocate bay command 366, open gate command 368, close gate command 370, driver not authorized command 372, print command 374 and top up command 376.

Machine readable medium 222 further can store several locations 385 within material processing plant where commands 350 can be executed. Locations 385 include bay 1 112, bay 2 114 and bay 3 116.

Figure 3B:
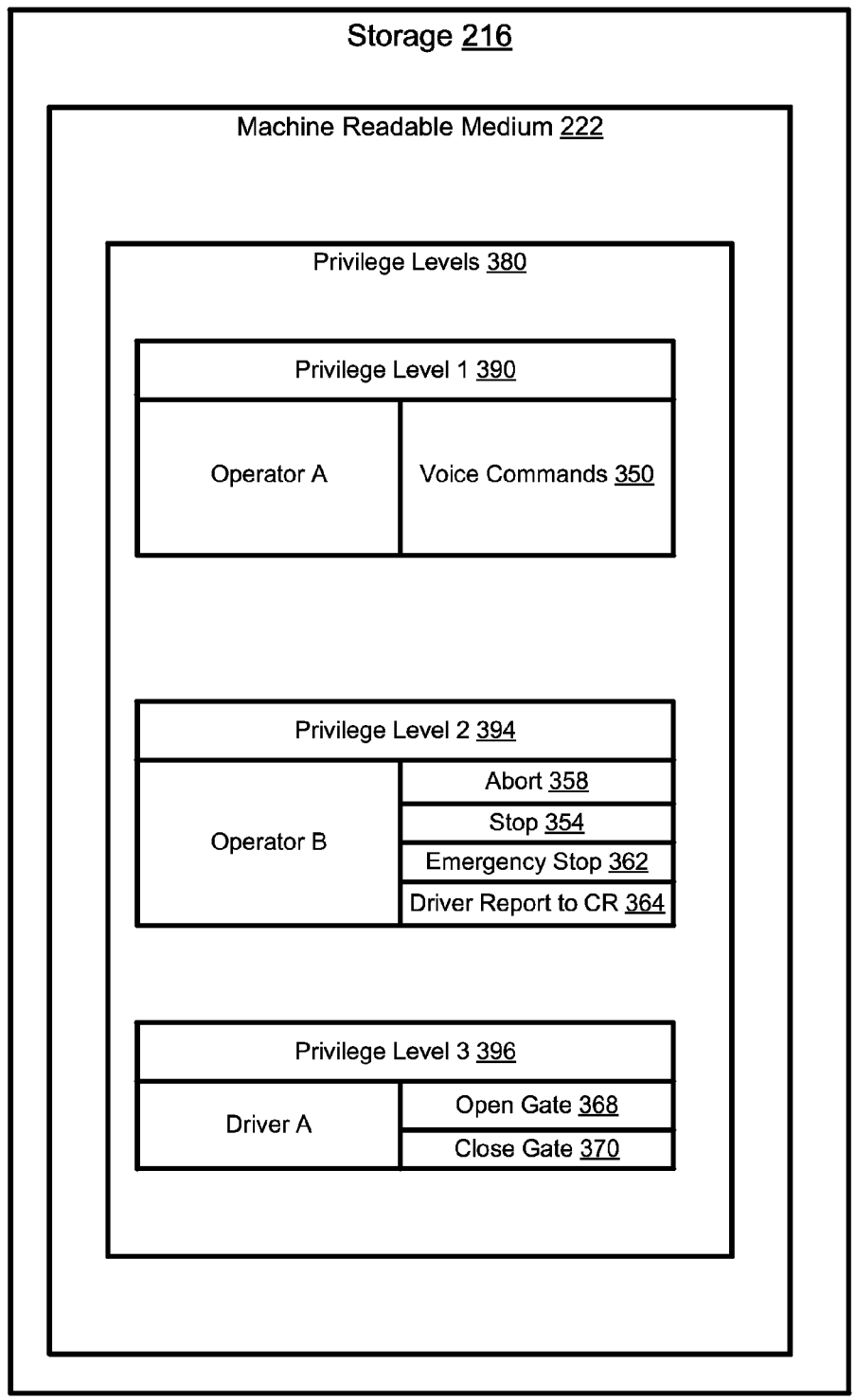

With reference to FIG. 3B, additional contents of machine readable medium 222 stored within storage device 216 are shown. Machine readable medium 222 can store several privilege levels 380. Privilege levels 380 identify specific voice commands 350 that each operator or driver is authorized to issue or perform. Certain operators or drivers may be restricted to only issue a limited number of voice commands 350. Other operators or drivers may be allowed to issue all of the voice commands 350.

Privilege levels 380 include privilege levels 390, 394 and 396. Privilege level 390 authorizes or permits operator A to issue all voice commands 350. Privilege level 394 restricts operator B to only issue stop command 354, abort command 358, emergency stop command 362 and driver report to control room command 364. Privilege level 396 authorizes or permits driver A to only issue open gate command 368 and close gate command 370.

Figure 4A:
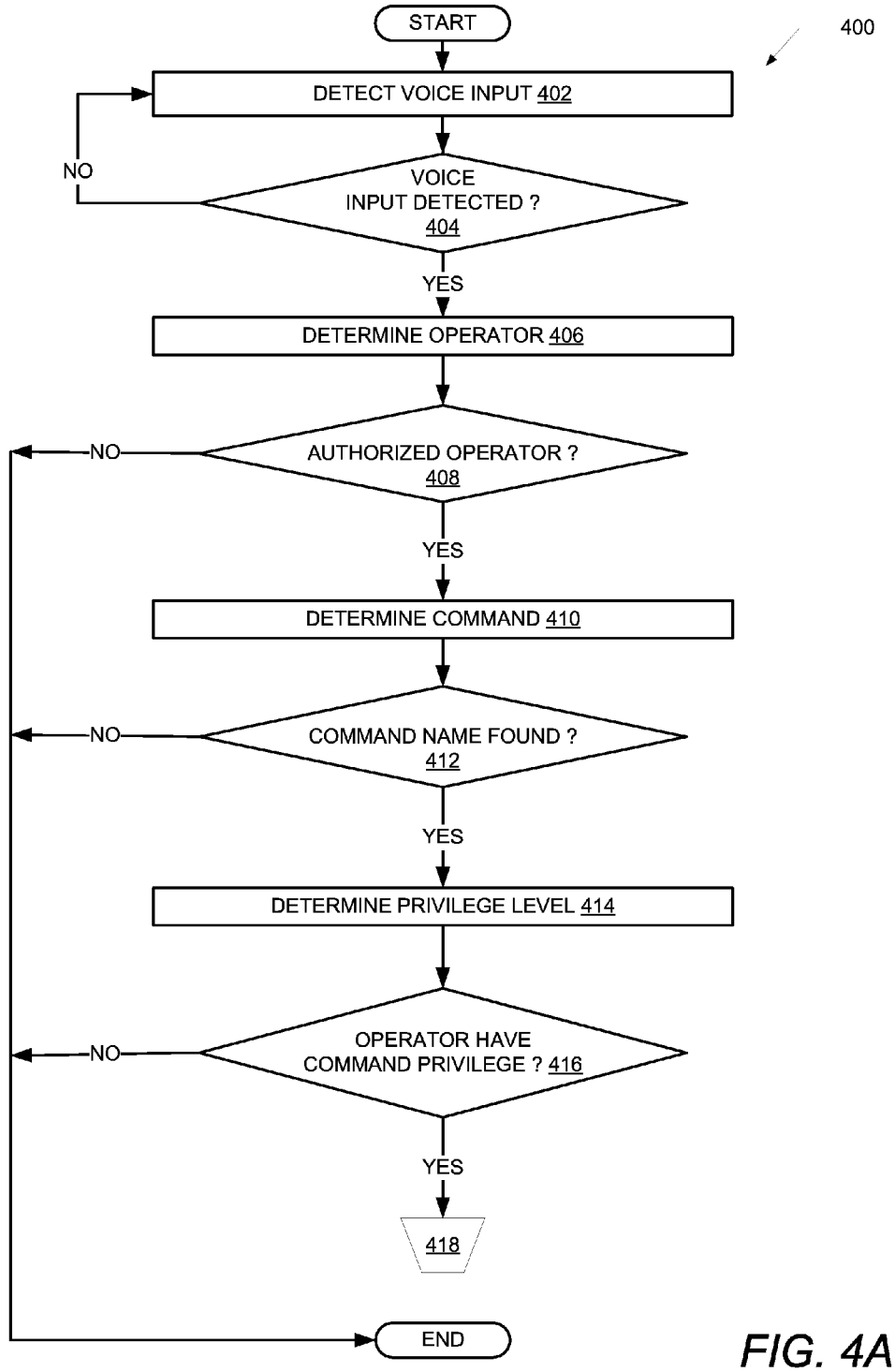
FIGS. 4A-4B provide a flow chart that shows steps in an example method of controlling processing equipment or material handling equipment involving a tangible material at a plant using voice data, according to an example embodiment.
Figure 4B:
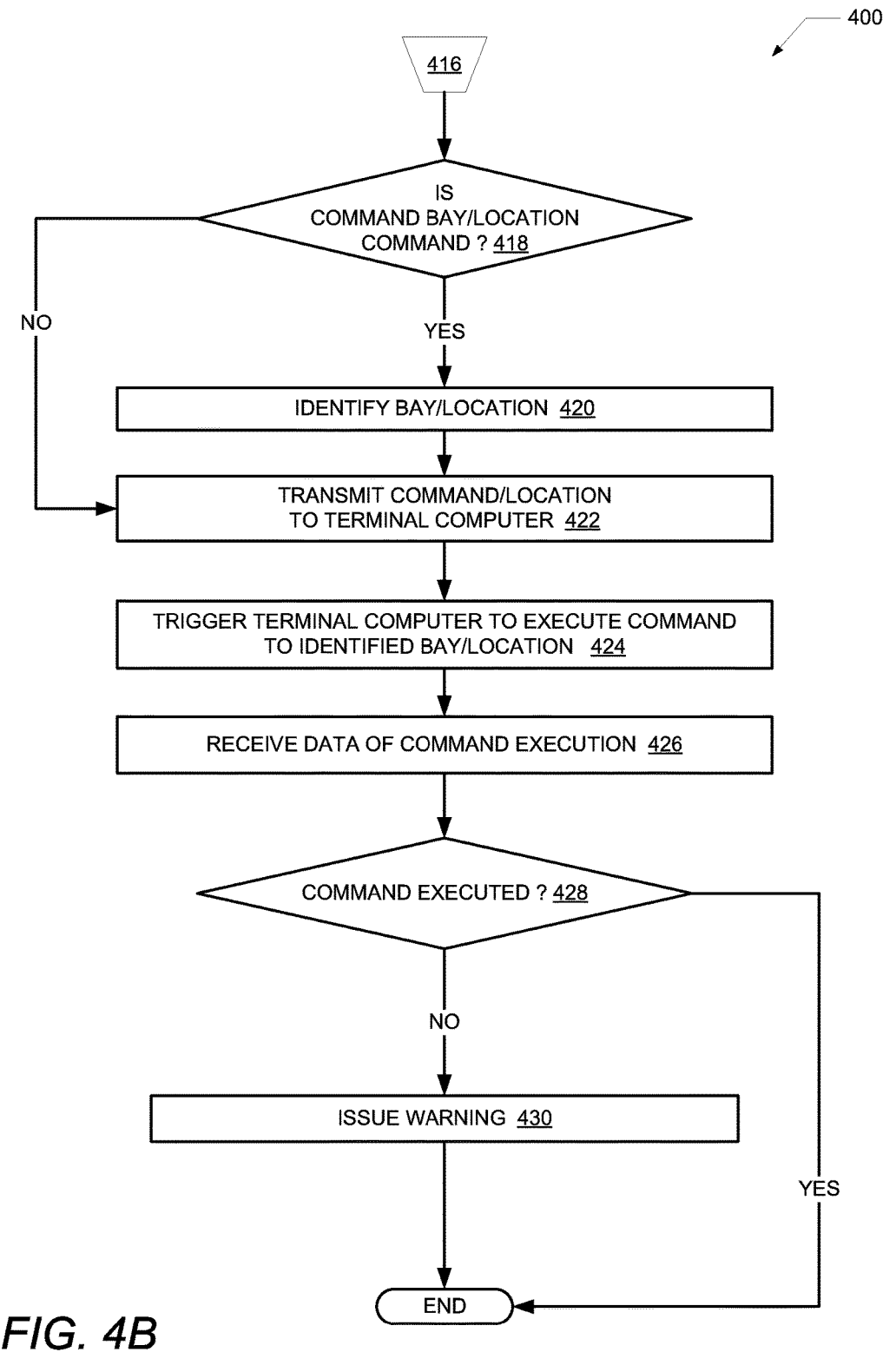

FIGS. 4A-4B provide a flow chart showing steps in an example method 400 for controlling processing equipment or material handling equipment involving a tangible material at material processing plant 100. Method 400 can be implemented via the execution of instructions 224 and/or algorithms 225 by processor 202 within the control computer 140. Method 400 begins at the start block and proceeds to block 402 where processor 202 checks or detects if operator voice input 330 has been received from microphone 142.

At decision block 404, processor 202 determines if operator voice input 330 has been received from microphone 142. In response to no operator voice input 330 being received, processor 202 continues to determine if operator voice input 330 has been received at block 402. In response to operator voice input 330 being received, processor 202, executing voice recognition program 312, determines the identity of the operator (block 406). Processor 202 executing voice recognition program 312 retrieves operator voice data 340 and compares the operator voice input 330 to operator voice identifiers 341-343 in order to determine the identity of the individual operator. Processor 202 analyzes the operator voice input 330 to determine if the voice-derived input matches the operator voice identifiers 341-343 for any of the authorized operators.

Processor 202, executing authenticated voice activated control program 310, determines if the identified operator is an authorized operator (block 408). In response to the identified operator not being an authorized operator, method 400 ends. In response to the identified operator being an authorized operator, processor 202 determines the commands contained within operator voice input 330 (block 410). Processor 202 retrieves the list of voice command 350 and compares the received voice-derived input to the list of voice commands 350.

At block 412, processor 202 determines if operator voice input 330 contains one or more voice commands 350. In response to the operator voice input 330 not containing a voice command 350, method 400 ends. In response to the operator voice input 330 containing at least one voice command 350, processor 202 determines a privilege level 380 associated with the identified operator (block 414). Processor 202 determines if the identified operator is authorized to issue the identified command (block 416). Processor 202 determines if the identified command is contained within the corresponding privilege level 380 associated with the identified operator.

In response to the identified operator not having the privilege level (authorization) to issue the identified command, method 400 ends. In response to the identified operator having the privilege level authorization to issue the identified command, processor 202 determines if the command is a bay/location specific command (block 418). In one embodiment, the voice commands 350 can be associated with actions at a specific one of bays 112-116. In response to the command being a bay/location specific command, processor 202 identifies the specific one of bays 112-112 where the voice command 350 is to be executed (block 420). In one embodiment, when the operator provides voice input, the voice input can include a location 385 such as one of bays 112-116. Processor 202 executing voice recognition program 312 retrieves locations 385 and compares the operator voice input 330 to the locations 385 in order to determine the specific one of bays 112-116.

After block 420 and also in response to the command not being a bay/location specific command, processor 202 transmits the identified one of commands 350 and the specific location 385 to terminal computer 130 via communication path 170 (block 422). Processor 202 triggers terminal computer 130 to execute the identified voice command 350 at the specific identified location 385 (block 424). Terminal computer 130 causes at least one of bay control devices 122-126 to execute the identified voice command.

After a pre-determined time period, processor 202 receives data from terminal computer 130 indicating the execution status of the issued voice command (block 426). At block 428, processor 202 determines if the voice command has been successfully executed. In response to the voice command being successfully executed, method 400 terminates. In response to the voice command not being successfully executed, processor 202 issues a warning to the operator (block 430) that the voice command was not executed via output devices/video display 210. Method 400 then ends.

Figure 5:
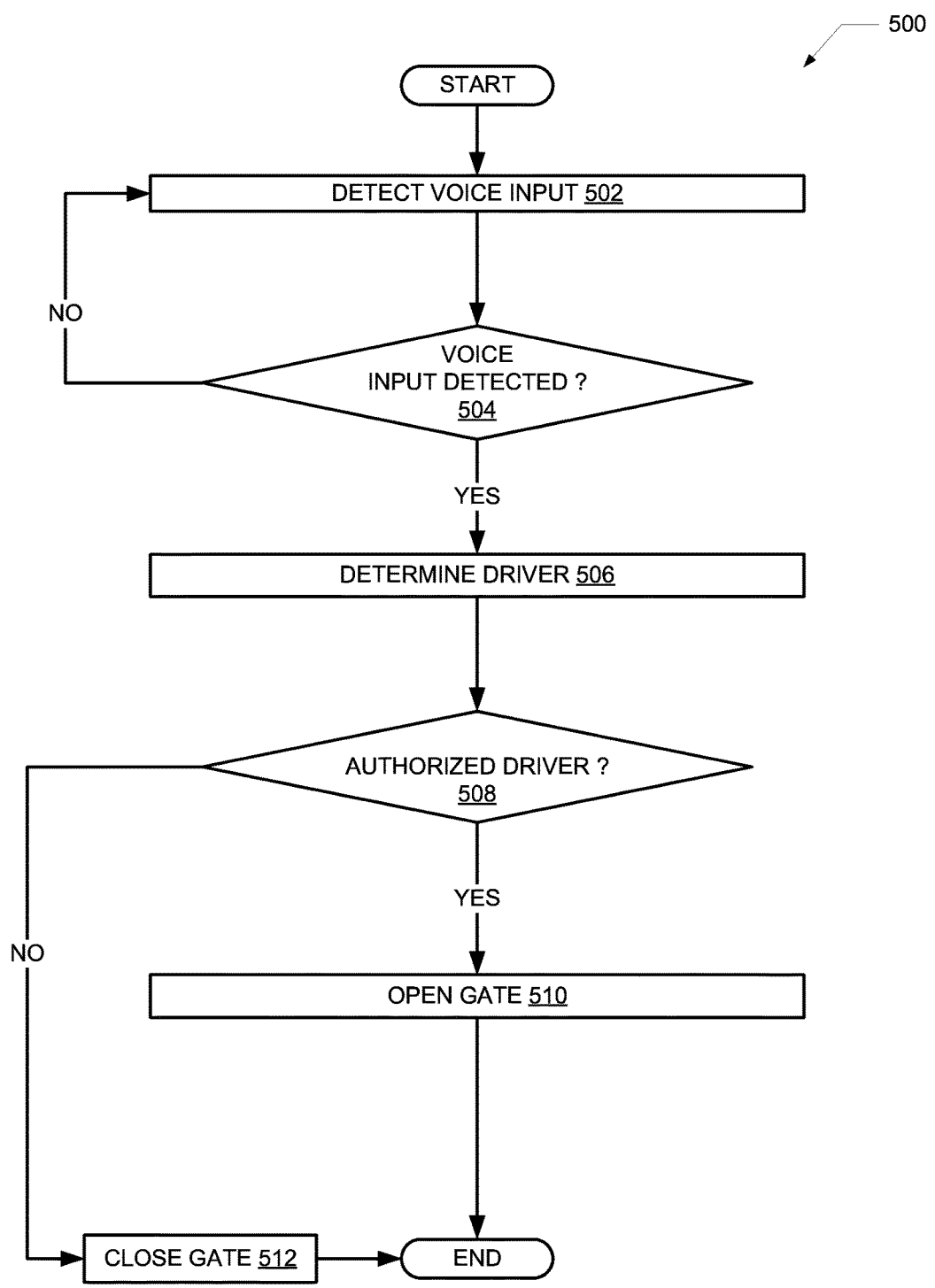
FIG. 5 is a flow chart that shows steps in a method of controlling access to a material processing plant using voice data, according to an example embodiment.

FIG. 5 is a flow chart showing steps in an example method 500 for controlling access to material processing plant 100 using voice data. Method 500 can be implemented via the execution of instructions 224 and/or algorithms 225 by processor 202 within the control computer 140. Method 500 begins at the start block and proceeds to block 502 where processor 202 checks or detects if driver voice input 335 has been received from microphone 144.

At decision block 504, processor 202 determines if driver voice input 335 has been received from microphone 144. In response to no driver voice input 335 being received, processor 202 continues to determine if driver voice input 335 has been received at block 502. In response to driver voice input 335 being received, processor 202, executing voice recognition program 312, determines the identity of the driver (block 506). Processor 202 executing voice recognition program 312 retrieves driver voice data 345 and compares the driver voice input 335 to driver voice identifiers 346-348 in order to determine the identity of the individual driver. Processor 202 analyzes the driver voice input 335 to determine if the voice-derived input matches the driver voice identifiers 346-348 for any of the authorized drivers.

Processor 202, executing authenticated voice activated control program 310, determines if the identified driver is an authorized driver (block 508) who is allowed access to material processing plant 100. In response to the identified driver not being an authorized driver, processor 202 triggers gate 171 to close or remain closed (block 512). Method 500 then terminates. In response to the identified driver being an authorized driver, processor 202 triggers gate 171 to open (block 510). Method 500 then ends.

While disclosed embodiments are described herein with voice control being implemented solely by the control computer 140, disclosed embodiments also include performing voice control implemented via the execution of disclosed instructions and/or algorithms by the terminal computer 130.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

As will be appreciated by one skilled in the art, the subject matter disclosed herein may be embodied as a system, method or computer program product. Accordingly, this Disclosure can take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, this Disclosure may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include non-transitory media including the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device.

The invention claimed is:

1. A method, comprising:
providing a control computer configured for controlling a loading terminal at a plant including multiple loading stations involving a tangible material stored at said plant, said control computer including non-transitory machine readable storage and at least one processor, wherein voice identification data for each of a plurality of authorized operators at said plant including data for said processor to specifically identify an identity of an individual one of said plurality of authorized operators based on comparing to a received operator's voice and an algorithm for voice recognition and authenticated voice-activated control (VR/VAC algorithm) of a filling operation of said tangible material into a truck of said operator at said loading terminal and privilege levels for specific voice commands that each of said plurality of authorized operators is authorized to perform regarding said filling operation are stored in said machine readable storage, said VR/VAC algorithm implemented by said processor causing said processor to execute:
responsive to receiving said operator's voice, analyzing said operator's voice to determine if said operator's voice matches said voice identification data for any of said plurality of authorized operators;
provided said operator's voice matches said voice identification data, identifying a first authorized operator from said plurality of authorized operators and a first privilege level for said first authorized operator from said privilege levels;
determining at least one command from said operator's voice from said specific voice commands,
determining if said command is contained in said first privilege level, and
executing said command to commence said filling operation to dispense said tangible material into said truck only if said command is contained in said first privilege level.

2. The method of claim 1, wherein if said command is determined, determining if said command is a location specific command and if said command is a location specific command, identifying a location associated with said location specific command.

3. The method of claim 2, wherein said location is transmitted with said command from said control computer to a terminal computer that is communicatively coupled by a communication path to said control computer.

4. The method of claim 1, wherein said VR/VAC algorithm is activated by said receiving of said operator's voice.

5. The method of claim 1, wherein said command comprises at least one of a start command, a stop command, a re-start command, an abort command, an authorize load command, an emergency stop command, a driver report to control room command, a de-allocated bay command, an open gate command, a close gate command, a driver not authorized command, a print command and a top up command.

6. A computer program product, comprising:
   a non-transitory data storage medium that includes program instructions executable by a processor to enable said processor to execute a method for controlling a loading terminal at a plant including multiple loading stations involving a tangible material at said plant, said plant including a communication system including a control computer communicatively coupled by a communication path to a terminal computer, wherein voice identification data for each of a plurality of authorized operators at said plant including data for said processor to specifically identify an identity of an individual one of said plurality of authorized operators based on comparing to a received operator's voice and an algorithm for voice recognition and authenticated voice-activated control (VR/VAC algorithm) of a filling operation of said tangible material into a truck of said operator at said loading terminal and privilege levels for specific voice commands that each of said plurality of authorized operators is authorized to perform regarding said filling operation are stored in said non-transitory data storage medium, said computer program product comprising:
      code for responsive to receiving said operator's voice, analyzing said operator's voice to determine if said operator's voice matches said voice identification data for any of said plurality of authorized operators;
      code for provided said operator's voice matches said voice identification data identifying a first authorized operator from said plurality of authorized operators and a first privilege level for said first authorized operator from said privilege levels,
      code for determining at least one command from said operator's voice from said specific voice commands,
      code for determining if said command is contained in said first privilege level, and
      code for executing said command to commence said filling operation to dispense said tangible material into a truck only if said command is contained in said first privilege level.

7. The computer program product of claim 6, wherein if said command is determined, said computer program product further comprises:
   code for determining if said command is a location specific command; and
   if said command is a location specific command, code for identifying a location associated with said location specific command.

8. The computer program product of claim 7, wherein said location is transmitted with said command from said control computer to said terminal computer.

9. The computer program product of claim 6, wherein said computer program product further comprises:
   code for activating said VR/VAC algorithm by said receiving of said operator's voice.

10. The computer program product of claim 6, wherein said command comprises at least one of a start command, a stop command, a re-start command, an abort command, an authorize load command, an emergency stop command, a driver report to control room command, a de-allocated bay command, an open gate command, a close gate command, a driver not authorized command, a print command and a top up command.

11. A system for controlling a loading terminal at a plant including multiple loading stations involving a tangible material stored at said plant, said system comprising:
   a control computer communicatively coupled by a communication path to a terminal computer; said control computer including a processor connected to a storage device having a non-transitory machine readable storage medium; wherein said storage device stores voice identification data for each of a plurality of authorized operators at said plant including data for said processor to specifically identify an identity of an individual one of said plurality of authorized operators based on comparing to a received operator's voice and privilege levels for specific voice commands that each of said plurality of authorized operators is authorized to perform regarding a filling operation of said tangible material into a truck of said operator at said loading terminal and a voice recognition and authenticated voice-activated control (VR/VAC) algorithm, wherein said control computer is programmed to implement said VR/VAC algorithm, wherein said control computer:
   responsive to receiving said operator's voice analyzes said operator's voice to determine if said operator's voice matches said voice identification data for any of said plurality of authorized operators;
   provided said operator's voice matches said voice identification data to identify a first authorized operator from said plurality of authorized operators and a first privilege level for said first authorized operator from said privilege levels, and to determine at least one command from said operator's voice from said specific voice commands,
   to determine if said command is contained in said first privilege level, and
   executes said command to commence said filling operation to dispense said tangible material into said truck only if said command is contained in said first privilege level.

12. The system of claim 11, wherein if said command is determined, said control computer determines if said command is a location specific command and if said command is a location specific command, said control computer identifies a location associated with said location specific command.

13. The system of claim 12, wherein said location is transmitted with said command from said control computer to said terminal computer.

14. The system of claim 11, wherein said VR/VAC algorithm is activated by said receiving of said operator's voice.

* * * * *